Figure 1:
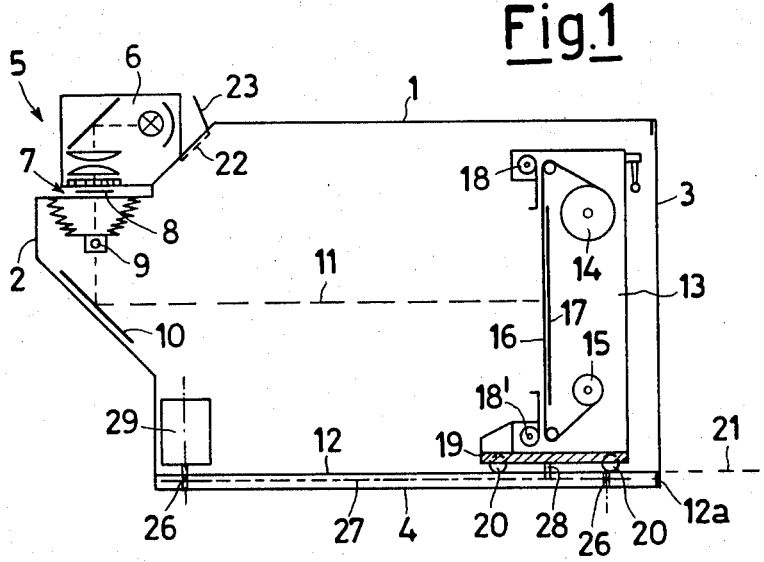

United States Patent [19]

Schmoker

[11] 4,229,098
[45] Oct. 21, 1980

[54] PHOTOGRAPHIC ENLARGER FOR PRODUCING GIANT-SIZE PRINTS

[75] Inventor: Peter Schmoker, Daenikon-Zurich, Switzerland

[73] Assignee: Fotomec S.p.A., Fiume Veneto, Italy

[21] Appl. No.: 954,916

[22] Filed: Oct. 26, 1978

[30] Foreign Application Priority Data

Oct. 31, 1977 [CH] Switzerland .................. 13212/77

[51] Int. Cl.² ............................................. G03B 27/70
[52] U.S. Cl. ..................................... 355/60; 355/18; 355/43; 355/72
[58] Field of Search .................. 355/18, 60, 43, 45, 355/27, 72

[56] References Cited

U.S. PATENT DOCUMENTS 3,146,661  9/1964  Young ................................. 355/27 X
3,207,030  9/1965  Polland ................................. 355/60
3,315,561  4/1967  Boutigue .......................... 355/45 X Primary Examiner—Richard A. Wintercorn
Attorney, Agent, or Firm—Cushman, Darby & Cushman

[57] ABSTRACT

A photographic enlargement system of the kind used in producing posters or giant-size prints has been improved by installing the focal plane, the photographic-paper feeding mechanism and a focal-plane-masking roller blind system on a carriage which can be moved toward or away of the optical enlarging system for focussing the image. The carriage forms a compact and self-contained unit which is enclosed in a light-tight fixed casing with which the optical enlarging system is integral.

Convenience and reliability of use are the distinguishing features.

7 Claims, 2 Drawing Figures

U.S. Patent     Oct. 21, 1980     4,229,098

PHOTOGRAPHIC ENLARGER FOR PRODUCING GIANT-SIZE PRINTS

This invention relates to a photography enlarger by means of which the image is projected, by an objective lens, onto the image surface of a lighting plane. Such an enlarger cooperates with a takeup drum and a delivery drum for the material to be exposed, and with a feeding device, as well as with a masking device for masking, at will, the photographic surface and for selecting the margin edges thereof.

Such printers produce the standard size enlargements of coloured negatives from small-size films. Printers of the kind referred to above are photographic enlargement systems by which, after having positioned the negative film in a specially provided space therefor, the intervals of time for exposure, the exposure stage, and the feed of the photographic papers which have been exposed in their turn are both automatically selected and carried out, so that a high hourly output of printed copies is achieved thereby.

The window for the copies with the objective lens for the reproduction is arranged vertically above the central portion of a lighting plane so that the photographic paper is by such means introduced into a luminous space of the printer and can be withdrawn therefrom again and sent to the exposure stage. There is also a roller or non-exposed photographic paper which is stored in a light-tight space from which the paper which lies on the lighting plane is conveyed towards a second storage space which is also light-tight.

In addition, an external copy-trimming device can be provided, by means of which a considerable waste of non-exposed photographic paper is prevented in the case that a roller of paper had been only partially exposed.

Such an enlarger system is not fit for enlarging small-size negatives to such a degree as to produce posters, which have a size of 50 by 70 centimeters and over since the operation of such a system becomes extremely irregular and clumsy.

For exposing large size paper surfaces, long focal lengths are required so that also wide intervals for the negatives are also required: under these conditions, a printer of the kind referred to above would become extremely tall and it would become cumbersome to change the paper in such an apparatus.

More particularly, the difficulties are exalted under the respect that the storage spaces housing paper roller of 50 centimeter width and over will have to bear an exceedingly high load.

According to the invention, the process run is so carried out that the plane of lighting, the takeup and delivery rollers for the material to be exposed together with the driving material for the paper to be exposed and the shuttering device are placed in a light-tight box which rolls on wheels, whereas the plane of exposure is in vertical position on a discrete delivery system which is actuated by wheels. A magnifying lens with an objective lens are arranged on the box-receiving compartment which slides horizontally or on guideways arranged on a horizontal plane.

In order that the images which must be enlarged might be positioned conveniently and regularly, there is, preferably, in the enlarging objective lens, a horizontal window and a reversible mirror or prism.

After the exposure in the compartment, the light-tight box can be removed easily from the compartment and can be brought into the darkroom, where the withdrawl of the exposed paper can be carried out in the dark.

In order that the heavy box may conveniently withdrawn from the container, there can be arranged on the baseplate of the box a first array of wheels (from 3 to 4), which are preferably rubber-lined and at least a couple of wheels will be steering wheels.

For the box to be positioned in the container in correct alignment relationship relative to the plane of exposure, it is advisable that a second set of wheels, preferably steel wheels, be provided.

The second wheel set can be arranged on the box, whereas the surfaces of the rollers of the second wheel set lies on that of the first set, so that the steel wheels, as they exit, have no contact with the box baseplate, and the rubber lined rollers of the first set, as the box is wheeled on the guideways of the container, have no contact with the baseplate of the box, either.

The second wheel set can also be arranged on the guideways in the container.

In order that an exact positioning of the plane of exposure might be obtained so as to obtain the desired size, the container can have a conveyance device, such as a conveying chain driven by two pinions, to which the box is fastened prior to the conveyance on the guideways or thereafter if preferred.

The accompanying drawings illustrate an exemplary embodiment of the invention.

Figure 2:
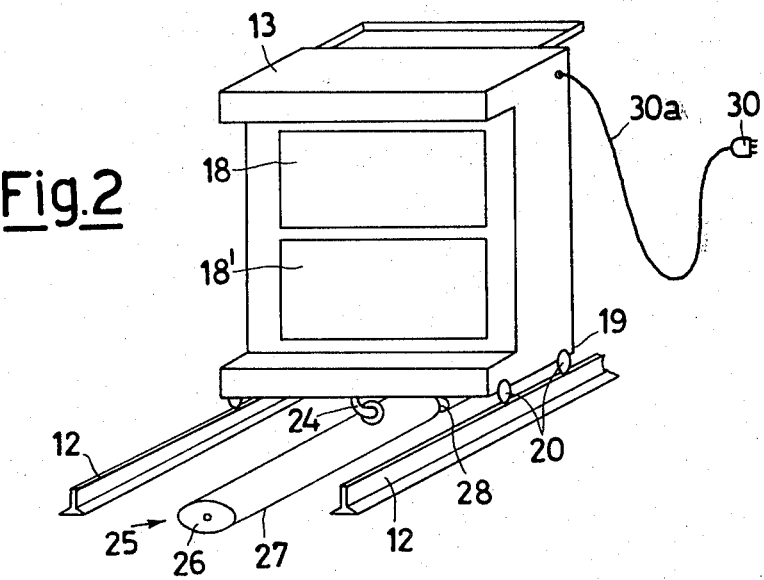

In the drawings:

FIG. 1 is a diagrammatical showing in cross-sectional view of the photographic enlarger of the invention, and FIG. 2 is perspective view of a slider and the plane of exposure, the box containing the material to be exposed being also depicted.

The enlarger intended for preparing giant-size enlargements shown in FIG. 1 is generally composed by a fixed container 1 which is formed on the front portion 2 in the shape of a work plane, and a slidable light-tight box 13 with the takeup drum 14 for the photographic paper, the delivery roller 15, the exposure plane 17 and the masking system 18.

On the work plane of the container 1 there is a common enlargement lens 5 with an illumination system 6, a horizontal space 7 in which a negative 8 to be enlarged is arranged, with an objective lens 9 and a mirror 10 of the reflective type.

To the base of the box 4 there are fastened two guiding parallel rails 12, the sliding planes of which lie on a horizontal position.

The sliding box 13 has a baseplate 19 which drives laterally on the sliding paths 12 the transport wheels 20 which are preferably made of steel.

The frontmost ends of the sliding wheels 20 are on a plane, the reference plane 21 and the exposure plane 17 in the sliding box 13 is vertical relative to the reference plane 21.

The reflective mirror 10 si directed towards the optical plane 12 so that, when the box 13 is moved frontwards and backwards on the rails 12 to produce the copy in the desired size, the exposure plane 17 is always correctly aligned without requiring any subsequent adjustments.

To facilitate the rest of the sliding box 13 on the rails 12, the terminations of these latter are arranged slightly vertically.

The masking device consists of an upper rolling blind 18 and a lower rolling blind 18' which can be actuated preferably by an electric motor (not shown). The rolling blinds 18, 18' are intended to shut the light from the exposure plane 17 when the slidable box 13 is brought away of the container 1 and for the production of photographs of special size (for example closeups) on the exposure plane 17.

On the rear portion the container 1 has a door through which the removable box 13 can be introduced into the container 1, or can be withdrawn therefrom. There are no exceptional requirements as to the light-tightness of the door 3 since, by exposure to light, no parasitic light radiations can imping onto the surface of the image on the exposure plane 17 and the masking blind roller system 18, 18' can always be actuated in the case of longer exposure times if necessary.

To check the sharpness of the image and in order to be able to arrange the roller blinds 18, 18' on the desired size, there is provided, on the working plane, an inspection window 22, which can be shuttered, for example, by a door 23.

To have the box 13 running away of the container 1, a baseplate 19 is provided, which has three or four wheels 24, preferably rubber-lined, one pair of which, at least, are intended to act as steering wheels.

The box 13 shown in FIG. 2 has three such rubber-lined wheels, of which only the front wheel 24 can be seen in the drawing. The sliding wheels 20 lie at a higher level than that of the rubber-lined wheels 24, so that when the box 1 is exited, the wheels 20 do not shake the base and the guideways 12 in the container 1 have such a height that, when the box 13 is shifted in the compartment 1, the conveying wheels 24 do not contact anyhow the base 4 of the compartment and the box 13 is actuated only by the accurately machined steel wheels 20 on the rails 12.

Upon the rails 12, exactly aligned in horizontal orientation, the box 13 which is comparatively heavy, can be moved into and from the container 1.

To secure the box 13 in the preselected position on the rails 12, a conventional stoppage device can be provided.

For effecting the frequent adjustments of the image size as required from time to time, a frequent manual adjustment of the box 13 is necessary, and each time that the door 3 must be opened, the shutter device 18, 18' is to be actuated.

To simplify the procedure, there is thus provided a device 25 for shifting the box 13 in the container 1, said device consisting, for example, of a conveyance chain 27 riding on pinions 26, to which the box 13 can be secured for entering and exiting the compartment 1, by the agency of a common latching device 28.

The actuation of the removal device 25, such as the conveying chain, the toothed rack, the cable and pulley and so forth, takes place manually via, for example, a crank which can be conveniently manipulated and placed on the front wall 2 of the container or by means of an electromotor 29 the actuating mechanisms for which are located on the work plane of the compartment 1.

The shutter device, that is the roller blinds 18, 18' for covering the illuminated surfaces on the exposure plane 17 and for defining the image size, as well as the delivery drum 15 for feeding the photographic paper are, as it is logical, automatically actuated and the previously mentioned actuation motors in the box 13 can be connected to a power source by means of a multipolar cable 30a with a socket 30 and the controls on the working plane.

The operation of the enlarger thus takes place in quite satisfactory a way on the work plane and the rear door 3 must be opened, and the box 13 displaced away of the luminous working area of the darkroom, only for withdrawing the exposed paper and for introducing the non-exposed paper.

For a still more convenient production of poster-like prints with the device of this invention, a plurality of shiftable boxes such as 13 could be provided beforehand, each of which is loaded with different photographic paper such as for black-and-white prints, color prints and/or different size prints.

I claim:

1. A photographic enlarger for producing large-size prints comprising: walls forming an enclosure; an enlargement optical system including an objective lens for projecting light rays in a vertical direction within the enclosure; a mirror within the enclosure for deflecting the vertical light rays to a horizontal direction on to a vertical exposure plane within the enclosure; a light-tight box within the enclosure, said box supporting takeup and delivery rollers for photographic paper and a driving mechanism therefor and said box supporting a shutter device for masking the exposure plane and for delimiting the copy size, and said box being arranged so that photographic paper extending between the rollers lies in the vertical exposure plane of the optical system; and mounting means for adjusting the position of the box horizontally toward and away from the mirror.

2. An enlarger as in claim 1 wherein said mounting means includes wheels carried by said box and engaging the floor of said enclosure.

3. An enlarger as in claim 2 wherein the bottom of said box is provided with horizontal parallel guideways on which said wheels ride.

4. An enlarger as in any one of claims 1, 2 or 3 wherein said optical system includes a horizontal window space for positioning a negative to be enlarged.

5. An enlarger as in claim 3 wherein there are first and second wheel systems each including a plurality of wheels, the wheels of the two systems being disposed at two different heights such that one system supports said box on said guideways when said box is in said enclosure and such that the other system supports said box on the floor when said box has been removed from said enclosure.

6. An enlarger as in claim 5 wherein the wheels of the system which supports said box on said guideways are metal and wherein the wheels of the other system are rubber-lined.

7. An enlarger as in any one of claim 1, 2 or 3 including a horizontally movable drive device within said enclosure and means for releasably connecting said box to said drive device.

* * * * *